A. H. MORSE.
Sulky Attachment for Buggies.
No. 216,436. Patented June 10, 1879.
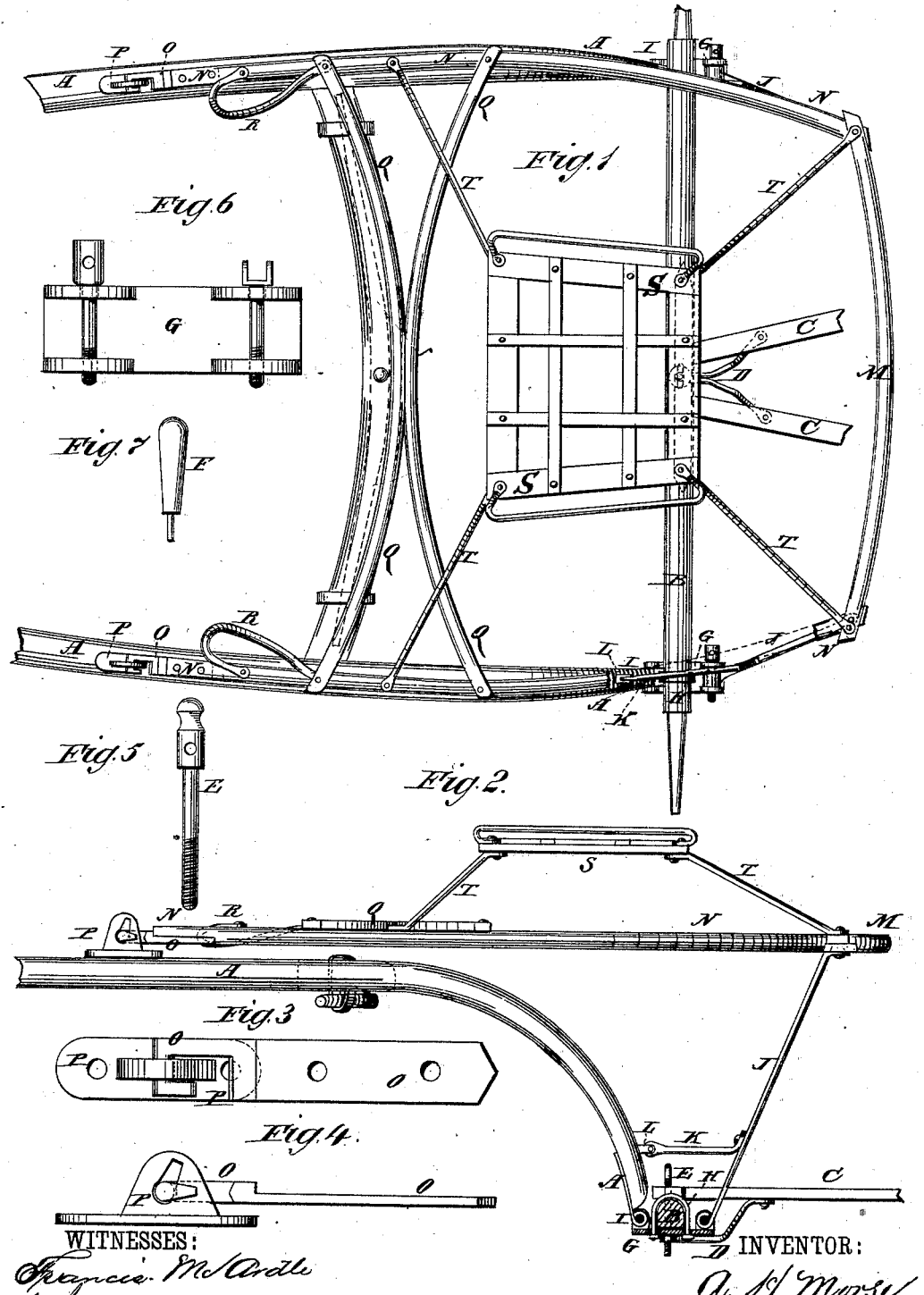
WITNESSES:
INVENTOR:
BY
ATTORNEYS.

UNITED STATES PATENT OFFICE.

ANDREW H. MORSE, OF NORWICH, CONNECTICUT.

IMPROVEMENT IN SULKY ATTACHMENTS FOR BUGGIES.

Specification forming part of Letters Patent No. 216,436, dated June 10, 1879; application filed January 15, 1879.

*To all whom it may concern:*

Be it known that I, ANDREW H. MORSE, of Norwich, in the county of New London and State of Connecticut, have invented a new and useful Improvement in Sulky Attachments for Buggies, of which the following is a specification.

Figure 1 is a top view of my attachment, shown as applied to the thills and forward axle of a buggy. Fig. 2 is a side view of the same, the axle being shown in cross-section. Fig. 3 is a detail top view of the coupling that connects the attachment with the thills. Fig. 4 is a detail side view of the same. Fig. 5 is a detail view of the king-bolt. Fig. 6 is a detail top view of the yoke of the axle-clip. Fig. 7 is a detail view of the bolt-lever.

Similar letters of reference indicate corresponding parts.

The object of this invention is to furnish an improved attachment, by the use of which the forward part of an ordinary buggy may be readily adjusted as a sulky, and which shall be simple in construction and convenient in use.

The invention consists in adapting the front running-gear of a buggy to receive a sulky-frame by means substantially as hereinafter described.

A represents the thills, B the axle, and C the reach, of an ordinary buggy. The forward end of the reach C rests upon the upper side of the axle B, and has a brace, D, attached to it, which passes beneath the said axle B.

E is the king-bolt, which passes through the reach C, through the axle B, and has a screw-thread cut upon its lower end to screw into a screw-hole in the brace D.

By this construction there will be no nut to work loose and lose off.

The bolt E has a hole formed through its head to receive the end of a small lever, F, for convenience in screwing it in and out. The lever F is made small, so that it may be carried in the pocket, if desired.

G is the yoke of the axle-clip, the bow H of which passes around the axle B in the usual way.

Upon the forward end of the yoke G are formed lugs to receive the eye of the thill-iron I. Upon the rear end of the yoke G are formed lugs to receive the eye formed upon the lower end of the bar J.

The eyes of the thill-irons I and of the bars J are secured to and between the lugs of the yoke G by bolts, which pass through them, through one of the said lugs, and screw into the other lug, and have holes through their heads, so that they can be screwed in and out by means of the wrench-lever F.

To the bars J are rigidly attached the rear ends of the arms K. The forward ends of the arms K are flattened and beveled to fit into the notched head of the bolts L, which may be the bolts that secure the thill-irons I to the thills A.

The upper ends of the bars J are secured to the ends of the cross-bar M and the rear ends of the side bars, N, at their points of intersection.

To the forward ends of the side bars, N, are attached straps O, the ends of which project, and have tapered right-angled hooks formed upon them, which hooks pass through tapered slots in lugs formed upon straps or plates P, which are secured to the thills A.

The slots in the lugs of the straps P are inclined upward, so that the hooks of the straps O cannot pass through them until the side bars, N, have been turned upward and forward.

The forward parts of the side bars, N, are connected by cross-bars or braces Q, and to the forward parts of the said side bars are attached loops R, to receive and support the driver's feet.

S is the driver's seat, to the four corners of which are attached the inner ends of four rods, T, the outer ends of which are attached to the side bars, N, as shown in Figs. 1 and 2.

With this construction, by withdrawing the king-bolt E, placing the rear wheels upon the forward axle, and applying the attachment to the thills and forward axle, a neat and serviceable sulky can be formed, and at a small expense.

The attachment can be applied and removed in a few minutes.

Having thus described my invention, I claim as new and desire to secure by Letters Patent—

A sulky-frame connected with the front axle and thills of a buggy by the sulky-bars J, arms K, hook-straps O, and slotted thill-straps P, as shown and described.

ANDREW HENRY MORSE.

Witnesses:
 WM. R. KELLY,
 JOSEPH KERSHAW.